United States Patent [19]

Sawyer

[11] Patent Number: 5,852,779
[45] Date of Patent: Dec. 22, 1998

[54] SYSTEM AND METHOD FOR HAVING A SINGLE GATEWAY SET-UP AND MAINTAIN LOCAL SIGNALLING CONNECTIONS

[75] Inventor: Steven Paul Sawyer, Fountain Hills, Ariz.

[73] Assignee: Motorola, Inc., Schaumburg, Ill.

[21] Appl. No.: 578,402

[22] Filed: Dec. 26, 1995

[51] Int. Cl.[6] .................................................. H04Q 7/36
[52] U.S. Cl. ...................... 455/445; 455/428; 455/427; 455/429; 455/430
[58] Field of Search ..................................... 425/427, 428, 425/455, 31.3, 403, 12.1, 13.1, 445, 422, 446, 444, 443, 449; 342/352, 353

[56] References Cited

U.S. PATENT DOCUMENTS 5,410,728  4/1995  Bertiger et al. ........................ 455/12.1
5,523,997  6/1996  Bishop, Jr. ............................... 455/422
5,634,190  5/1997  Wiedeman .............................. 455/13.1

*Primary Examiner*—Dwayne D. Bost
*Assistant Examiner*—Keith Ferguson
*Attorney, Agent, or Firm*—Harold C. McGurk; Jennifer B. Wuamett

[57] ABSTRACT

A system (10) and method (100) selects one of the gateways (40, 41) to set-up and maintain signalling resources associated with a call. Instead of having two gateways (40, 41) handle signalling resources, a single gateway (40) becomes the serving gateway for one or both of the subscriber units' call segment. The system and method do not establish a transit connection between gateways (40, 41).

14 Claims, 3 Drawing Sheets

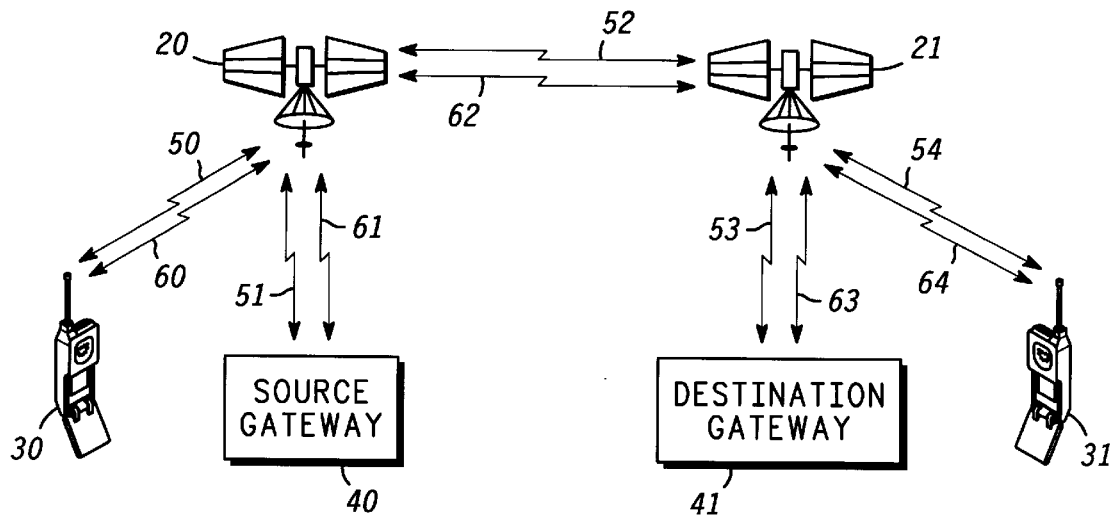
FIG. 1  —PRIOR ART—
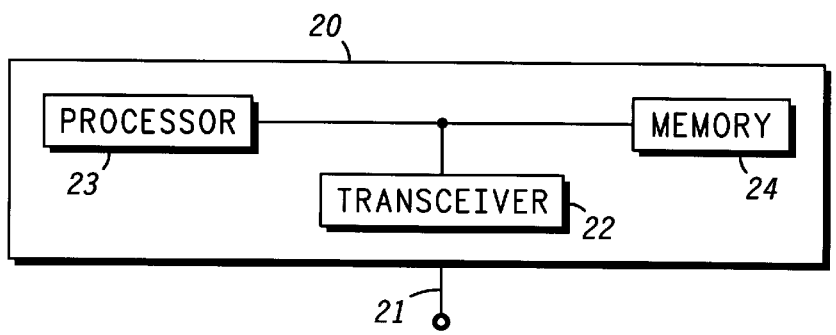
FIG. 2
FIG. 4
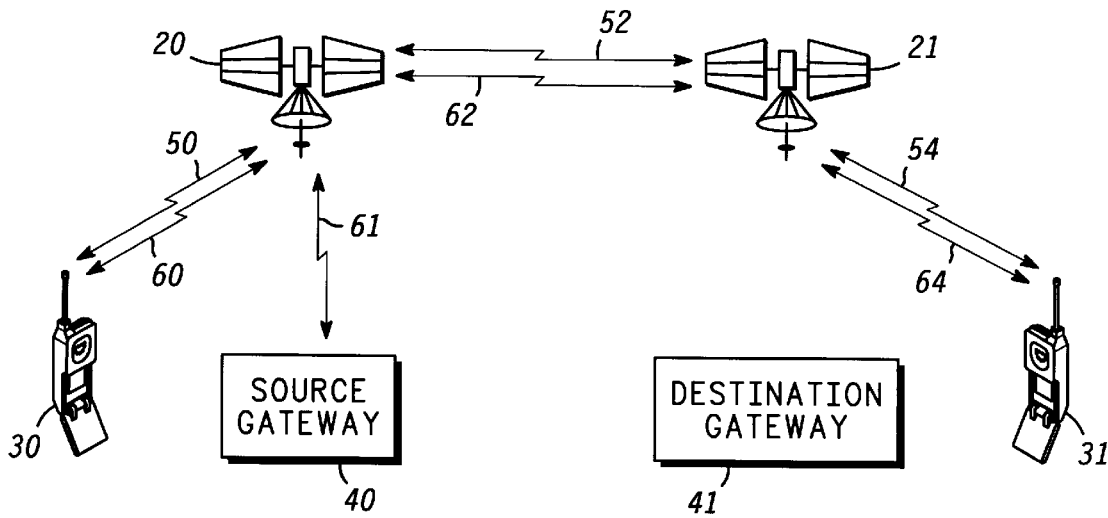

SYSTEM AND METHOD FOR HAVING A SINGLE GATEWAY SET-UP AND MAINTAIN LOCAL SIGNALLING CONNECTIONS

TECHNICAL FIELD

This invention relates generally to telecommunication systems and, in particular, to a system and a method for eliminating unnecessary signalling connections.

BACKGROUND OF THE INVENTION

Whenever a subscriber unit (e.g., mobile telecommunication telephone) located at a first gateway wants to communicate with another subscriber unit located at a second gateway, a conventional call set-up process is executed to establish signalling and voice connections so that the two subscriber units can communicate with each other. A signalling connection is used for passing control or signalling information between two nodes, for example, a subscriber unit and a gateway. A mission connection is used for passing voice and/or data between two subscriber units. Both the signalling and voice connections are necessary for handling a call between two subscriber units in a telecommunications network.

The normal call set-up process will be described as it relates to telecommunication system 10 as shown in FIG. 1. When subscriber unit 30 wants to communicate with subscriber unit 31, subscriber unit 30 first establishes a signalling connection to source gateway 40. The signalling connection may pass through a satellite and may include signalling segments 60 and 61 as shown in FIG. 1. Source gateway 40 then sets-up a subscriber unit half-call involving a local connection between itself and subscriber unit 30. A local connection includes both a local signalling connection and a local mission connection. The local mission connection is "half" of a call, because the two subscriber units 30 and 31 will eventually send mission data directly to each other.

Once the local connection is created by source gateway 40, source gateway 40 next determines where subscriber unit 41 is located by using, for example, standard GSM location methods involving HLR/VLR queries. HLR represents home location register, while VLR represents visitor location register. After determining that subscriber unit 31 is located in another gateway's region, source gateway 40 establishes a transit connection to the other gateway, i.e., destination gateway 41. A transit connection includes both a transit signalling connection and a transit mission connection. As shown in FIG. 1, these connections may pass through satellite 20 and 21 and include signalling segments 61, 62 and 63, and mission segments 51, 52 and 53.

After the transit connection is established, destination gateway 41 then sets-up a subscriber unit half-call which involves a local connection between itself and subscriber unit 31. The local connection includes both a local signalling connection and a local mission connection, and consists of local mission segments 63 and 64 and local signalling segments 63 and 64.

Once the two local connections and transit connections are established and a voice cut-through has occurred at both gateway 40 and 41, subscriber units 30 and 31 communicate with each other over a mission connection. A voice cut-through process executed by the gateways eliminates the need for the voice/data to pass through source gateway 40 and destination gateway 41. For example, voice/data is transmitted between subscriber units 30 and 31 over mission segments 50, 52 and 54, which bypasses mission segments 51 and 53.

This conventional call set-up process inefficiently reserves signalling resources, because after call set-up, the transit connection between two gateways is not normally used until call tear-down. Thus, there is a significant need for a system and a method that avoids the need to set-up a transit connection.

This conventional call set-up process inefficiently uses signalling resources by establishing a transit signalling connection between two gateways. Thus, there is a significant need for a system and a method that solves the problem of continuing to use unnecessary signalling resources and avoiding the need to establish a transit signalling connection between two gateways.

BRIEF DESCRIPTION OF THE DRAWINGS

FIG. 1 shows an example of a prior art space-based mobile telecommunication system;

FIG. 2 shows a general view of the components of a node, including satellites, gateways and subscriber units according to a preferred embodiment of the present invention;

FIG. 4 shows signalling cut-through for a system where two subscriber units are communicating to each other;

DESCRIPTION OF THE PREFERRED EMBODIMENTS

Figure 3:
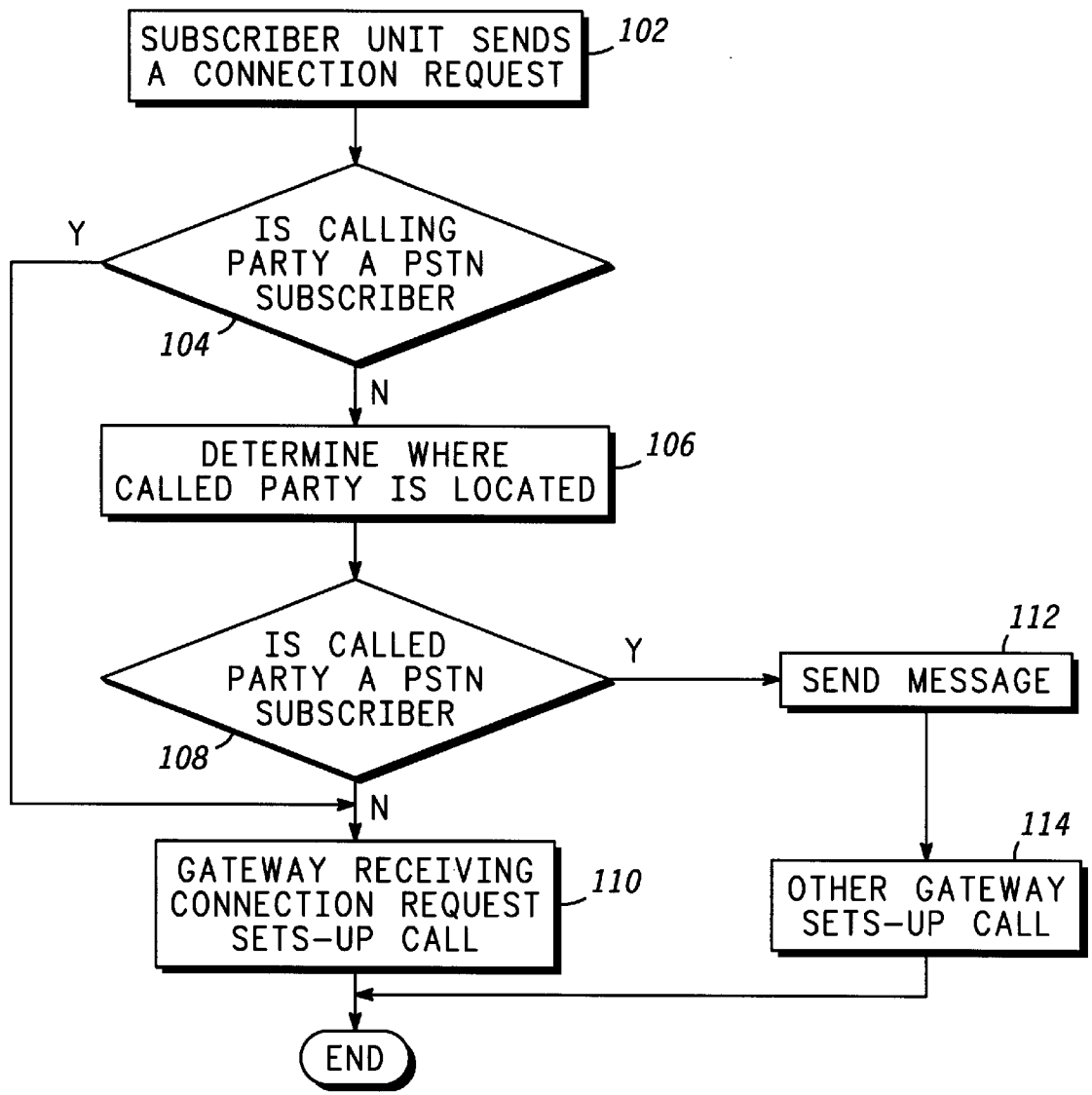
FIG. 3 shows a flowchart of a method for executing smart local establishment according to a preferred embodiment of the present invention.

The present invention has utility in that it reduces the amount of resources reserved for the duration of the call for calls involving more than one gateway. Instead of having two gateways handle signalling resources, one gateway is the serving gateway for a subscriber unit call segment. The most logical gateway chosen to be the serving gateway is based on the call arrangement. The present invention avoids the need to set-up a transit connection by modifying the current call set-up process to cause the signalling connections to be set-up by a single gateway.

A "satellite" as used throughout this description means a manmade object or vehicle intended to orbit the earth. A "satellite" comprises geostationary, low-earth and medium-earth orbiting satellites and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial or space-based telecommunication systems and/or combinations thereof.

FIG. 1 shows an example of space-based telecommunication system 10. Although FIG. 1 illustrates a highly simplified diagram of mobile telecommunication system 10, system 10 comprises at least one satellite 20, any number of subscriber units 30 and at least one gateway 40 or 41. Generally, satellites 20, 21, subscriber units 30, 31 and gateways 40, 41 of telecommunication system 10 may be viewed as a network of nodes. All nodes of communication system 10 are or may be in data communication with other nodes of communication system 10 through communication links. In addition, all nodes of telecommunication system 10 are or may be in data communication with other telephonic devices dispersed throughout the world through public service telephone networks (PSTNs) and/or conventional terrestrial communication devices coupled to a PSTN through conventional terrestrial base stations.

The present invention is applicable to space-based telecommunication systems 10 that assign particular regions on the earth to specific cells on the earth, and preferably to systems 10 that move cells across the surface of the earth. Although the present invention is applicable to space-based telecommunication systems 10 having at least one satellite 20 in low-earth, medium-earth or geosynchronous orbit, satellite 20 is preferably in low-earth orbit around earth. Satellite 20 may be a single satellite or one of many satellites 20, 21 in a constellation of satellites orbiting earth. The present invention is also applicable to space-based telecommunication systems 10 having satellites 20, 21 which orbit earth at any angle of inclination including polar, equatorial, inclined or other orbital patterns. The present invention is applicable to systems 10 where full coverage of the earth is not achieved (i.e., where there are "holes" in the telecommunication coverage provided by the constellation) and to systems 10 where plural coverage of portions of the earth occur (i.e., more than one satellite is in view of a particular point on the earth's surface).

Each satellite 20 communicates with other nearby satellites 21 through cross-links. These cross-links form a backbone of space-based mobile telecommunication system 10. Thus, a call or communication from subscriber unit 30 located at any point on or near the surface of the earth may be routed through satellite 20 or a constellation of satellites 20, 21 to within range of substantially any other point on the surface of the earth. A communication may be routed down to subscriber unit 31 (which is receiving the call) on or near the surface of the earth from satellite 21. How satellite 20 physically communicates (e.g., spread spectrum technology) with subscriber units 30 and gateway 40 is well known to those of ordinary skill in the art.

Subscriber units 30, 31 may be located anywhere on the surface of earth or in the atmosphere above earth. Mobile telecommunication system 10 may accommodate any number of subscriber units 30, 31. Subscriber units 30, 31 are preferably communication devices capable of receiving voice and/or data from satellites 20, 21 and/or gateways 40, 41. By way of example, subscriber units 30, 31 may be hand-held, mobile satellite cellular telephones adapted to transmit to and receive transmissions from satellites 20, 21 and/or gateways 40, 41. Moreover, subscriber units 30 may be computers capable of sending email messages, video signals or facsimile signals just to name a few.

How subscriber units 30, 31 physically transmit voice and/or data to and receive voice and/or data from satellites 20, 21 is well known to those of ordinary skill in the art. In the preferred embodiment of the present invention, subscriber unit 30 communicates with satellite 20 using a limited portion of the electromagnetic spectrum that is divided into numerous channels. The channels are preferably L-Band, K-Band, S-band frequency channels or combination thereof, but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Gateways 40, 41 communicate with and control satellites 20, 21. There may be multiple gateways 40, 41 located at different regions on the earth. For example, there may be one gateway 40 located in Honolulu, another gateway 41 located in Los Angeles and another gateway in Washington, D.C. Another example is to have separate gateways 40 located in each country on the earth. Gateways 40, 41 may provide satellite signalling commands to satellites 20, 21 so that satellites 20, 21 maintain their proper position in their orbit and perform other essential house-keeping tasks. Gateways 40, 41 may be additionally responsible for receiving voice and/or data from satellites 20, 21. How gateways 40, 41 physically communicate (e.g., spread spectrum) with satellites 20, 21 and/or subscriber units 30, 31 is well known to those of ordinary skill in the art.

FIG. 2 shows a general view of the components of a node, including satellites 20 and 21, gateways 40 and 41 and subscriber units 30 and 31 according to a preferred embodiment of the present invention. For purposes of this description, reference will be made to satellite 20, although most of the components are similar to those in gateway 40. Satellite 20 comprises at least the following components: antenna 21, transceiver 22, processor 23 and memory 24. There may be other components of satellite 20 that are not shown which are necessary for operating a satellite but are not important to the present invention. These other components are well known to those of ordinary skill in the art, including for example, solar arrays and fuel propulsion system in satellites 20, or switches and network routers in gateways 40. Moreover, there may be more than one of the components in satellite 20, such as multiple antennas 21 and processors 23, for example.

Antenna 21 of satellite 20 is coupled to transceiver 22, while transceiver 22, processor 23 and memory 24 are inter-coupled to each other. Transceiver 22 is able to transmit or receive data or voice, and may be for example, a modem. Transceiver 22 is also capable of receiving data from subscriber units 30 and/or gateway 40. Processor 23, via a software program controls the operation of satellite 20 and the other components of satellite 20. Memory 24 stores part of the software executable version of method 100 (described below) and other software programs. Antenna 21, transceiver 22, processor 23 and memory 24 are all well known to those of ordinary skill in the art.

FIG. 3 shows a flowchart of method 100 for executing smart local establishment according to a preferred embodiment of the present invention. Method 100 is a software program that is executed by a number of network nodes (e.g., satellites 20 and 21, subscriber units 30 and 31, and gateways 40 and 41) in the preferred embodiment. The network nodes may execute concurrently with this program other software programs as well.

One of the important purposes of method 100 is to allow a single gateway to set-up and maintain signalling connections associated with a call. In cases where a voice cut-through is possible, meaning that the voice communication between subscriber unit 30 and 31 passes along voice connections 50, 52 and 54 and bypasses gateways 40, 41, there is no need for two gateways to be involved in the signalling of this call. In other words, the signalling can be set-up and maintained by one of the gateways.

This method is applicable to three different calling arrangements. The first arrangement is when subscriber unit 30 originates a call to subscriber unit 31, with subscriber unit 30 in a region serviced by source gateway 40 and with subscriber unit 31 in a region serviced by destination gateway 41. The second calling arrangement is when subscriber unit 30 originates a call to subscriber unit 31, where subscriber unit 30 is in a region serviced by source gateway 40, and where subscriber unit 31 is connected to destination gateway 41 over a PSTN. The third calling arrangement is when subscriber unit 30 originates a call to subscriber unit 31, where subscriber unit 30 is coupled to source gateway 40 via a PSTN, and subscriber unit 31 is in a region serviced by destination gateway 41. The execution of method 100 will be described as it relates to the first calling arrangement, followed by the second and third calling arrangements. Throughout this description, a "calling party" is the party originating the call. The "called party" is the party receiving or designated to receive the call.

Method 100 begins in step 102 when a subscriber unit accesses system 10 and sends a connection request to a satellite currently serving it. In the example shown in FIG. 1, the satellite that is currently serving subscriber unit 30 is satellite 20. The connection request includes information about the subscriber unit, including for example, a location of the subscriber unit on the earth, a home gateway identification (ID) and a priority of the call, such as whether the call is an emergency call.

The gateway that receives the connection request (i.e., source gateway 40) next determines in step 104 whether the calling party is a public-switched telephone network (PSTN) subscriber unit. A PSTN subscriber unit is a regular telephone unit coupled to the gateway via a PSTN. If the calling party is not connected to source gateway 40 via the PSTN, source gateway 40 next determines in step 106, the location of the called party's subscriber unit. The process used for determining the location of the called party's subscriber unit is a conventional GSM process. This process includes source gateway 40 sending a home location register (HLR) query for the location of the called party's subscriber unit. In response to the HLR query, the home gateway where the called party's subscriber unit is registered responds with information about the subscriber unit. This information includes visitor location register (VLR) information. The VLR information indicates whether the called party's subscriber unit is located in a region serviced by the same gateway (i.e., source gateway 40) or in another region serviced by another gateway (e.g., destination gateway 41).

Once the location of the subscriber unit is determined in step 106, the gateway that received the connection request determines in step 108 whether the called party's subscriber unit is connected to another gateway via the PSTN. If the source gateway 40 determines in step 108 that the called party's subscriber unit is not connected to another gateway via the PSTN, this means that neither the calling party's subscriber unit nor the called party's subscriber is connected to the PSTN. In this case, source gateway 40 is chosen in step 110 to set-up and maintain local signalling connections for subscriber units 30 and 31. A number of different criteria, including for example, congestion levels or political considerations, could be used to decide which gateway 40 or 41 should be selected. In an alternative embodiment, either gateway 40 or 41 could be used for setting-up and maintaining local signalling connections.

According to the preferred embodiment, the call set-up procedure initiated in step 110 by source gateway 40 involves source gateway 40 establishing two local connections: a first local signalling connection between source gateway 40 and subscriber unit 30 and a second local signalling connection between source gateway 40 and subscriber unit 31. The first local signalling connection comprises in part, signalling segments 60 and 61 as shown in FIG. 1. Source gateway 40 establishes the second local signalling connection for subscriber unit 31 by using signalling segments 61, 62 and 64 as shown in FIG. 1. The voice path between subscriber unit 30 and subscriber unit 31 comprises voice connections 50, 52 and 54. After the connections are set-up, method 100 ends.

After source gateway 40 sets-up the local signalling connections, source gateway 40 directly generates a ring alert to subscriber unit 31. The ring alert message comprises information about where subscriber unit 31 should respond. However, system 10 has to be configured so that subscriber unit 31 can respond directly back to source gateway 40 with a paging response message, the typical response to a ring alert message. This avoids the need for another gateway to perform this function, as is currently performed by conventional call set-up methods.

In an alternative embodiment, system 10 may not be configured in order to permit subscriber unit 31 to answer a ring alert by directing its call to source gateway 40. In this case, subscriber unit 31 may respond to its home gateway. The home gateway then sends a message to the gateway physically closest to the subscriber unit. Source gateway 40 then sends a new message to the other gateway, which, instead of initiating set-up of a transit connection, informs the other gateway to forward subscriber unit's 31 response to source gateway 40. Source gateway 40 processes the call rather than having destination gateway 41 process the call. At this point, source gateway 40 takes over as the serving gateway of subscriber unit 31, sending a message to the satellite serving subscriber unit 31 (e.g., satellite 21) to communicate with the gateway that is servicing the call and signaling resources.

In another alternative embodiment, source gateway 40 sends a message to the other gateway (e.g., destination gateway 41) before the ring alert message is sent to the called party's subscriber unit 31 by destination gateway 41. After destination gateway 41 receives the response from subscriber unit 31, it forwards the response from called party's subscriber unit to source gateway 40.

FIG. 4 shows segments of signalling and mission connections for a system where a subscriber unit is communicating with another subscriber unit. The local signalling connections for subscriber units 30 and 31 are handled by source gateway 40. After execution of the steps of method 100 (FIG. 3), the signalling and voice connections result in the system configuration shown in FIG. 4. In this system 10, there are two local connections and no transit connections. The first local signalling connection between source gateway 40 and subscriber unit 30 comprises signalling segments 60 and 61. The second local signalling connection between source gateway 40 and subscriber unit 31 comprises signalling segments 61, 62 and 64. Subscriber unit 30 and subscriber unit 31 communicate voice and/or data over mission segments 50, 52 and 54. Notice that there are no signalling or voice connections between destination gateway 41 and satellite 21 meaning that destination gateway 41 is not involved with the call in any way. Any subsequent cut-through, reconfiguration, supplementary service management, etc., is performed by source gateway 40.

Figure 5:
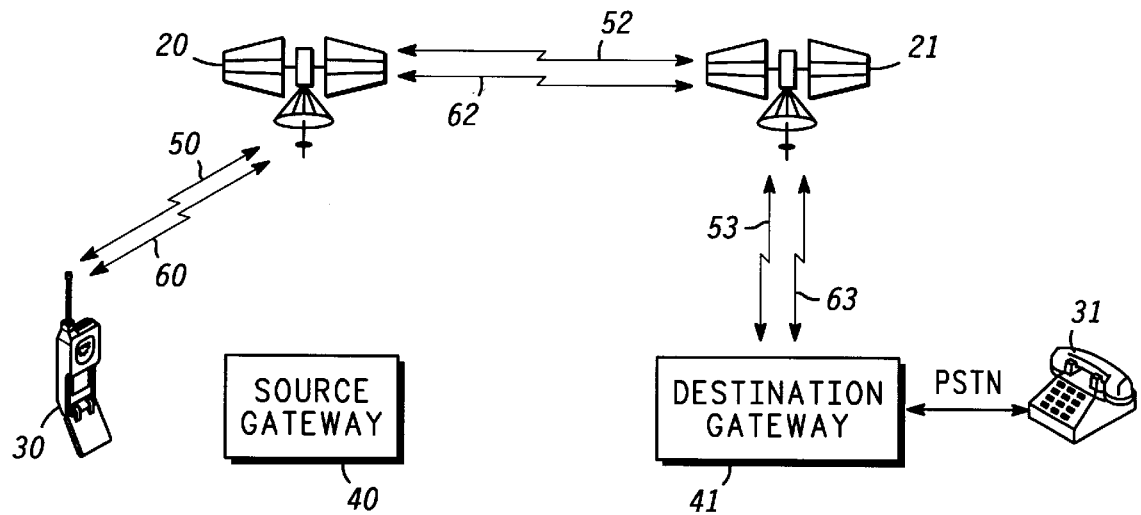
FIG. 5 shows signalling cut-through for a system where a subscriber unit is communicating to a PSTN subscriber.

The second calling arrangement is when the called party's subscriber unit is a PSTN subscriber unit connected over the PSTN to destination gateway 41 as shown in FIG. 5. Method 100 is executed to avoid creating unnecessary signalling connections. After the subscriber initiates a connection request in step 102 and a gateway receiving the request (e.g., source gateway 40), finds that the calling party's subscriber unit 30 is not connected to the source gateway 40 via the PSTN, source gateway 40 determines in step 106 the location of the called party's subscriber unit. Source gateway 40 determines from the called party number the gateway serving the called PSTN party (and the fact that it is a PSTN subscriber). However, other conventional or standard telecommunication techniques may be used as well.

As soon as source gateway 40 discovers in step 108 that the called party's subscriber unit 31 is a PSTN subscriber being serviced by another gateway (e.g., destination gateway 41), source gateway 40 suspends call processing at this point and sends in step 112 a message to destination gateway 41 that informs the destination gateway 41 to take over the call set-up process.

The best choice for servicing signalling connection is destination gateway 41 because the voice and/or data path passes through destination gateway to subscriber unit 31 as shown in FIG. 5. Source gateway 40 also sends in step 112 all necessary half-call information to destination gateway 41. Destination gateway 41 receives the messages sent in step 112 and based on the contents of the message, sets-up in step 114 a local signalling connection to subscriber unit 30. Destination gateway 41 also sends a message to the satellite serving subscriber unit 30 (e.g., satellite 20 as shown in FIG. 5) that informs satellite 20 to communicate with destination gateway 41 instead of source gateway 40 for the duration of the call. At this point, destination gateway 41 sends a message to subscriber unit 30, and the call set-up continues as if the connection request had been received by destination gateway 41 instead of source gateway 40.

Figure 6:
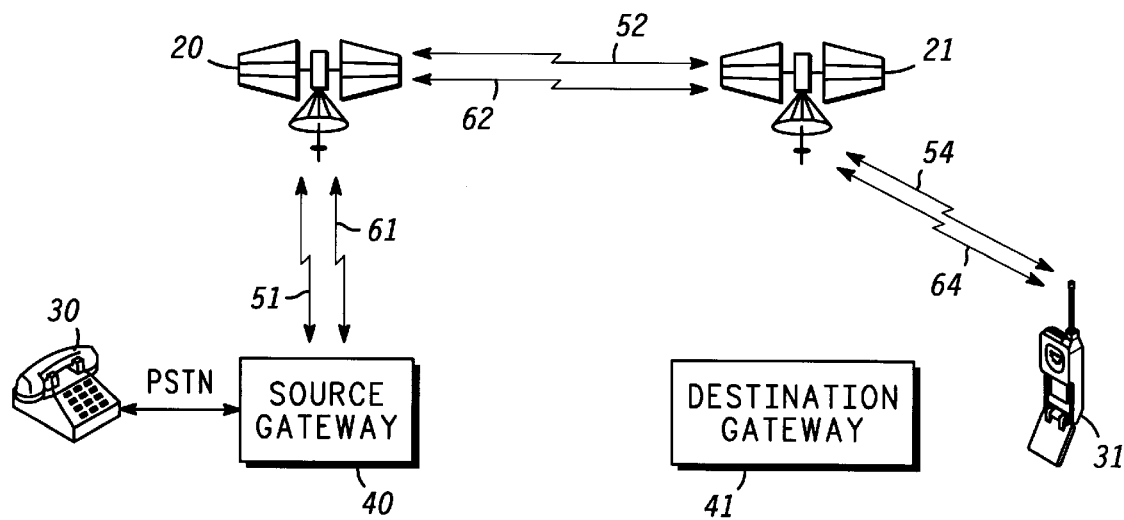
FIG. 6 shows signalling cut-through for system where a PSTN subscriber is communicating to a subscriber unit.

When a calling party is a PSTN subscriber unit at source gateway 40, the final network configuration after execution of method 100 results in a system shown in FIG. 6. This case is the reverse of the case when the called party is a PSTN subscriber at destination gateway 41. According to method 100, once the gateway that receives the connection request discovers in step 104 that the calling party is a PSTN subscriber unit, this gateway becomes the best choice for servicing the calling party's subscriber unit and managing the local signalling connection for the call. The selected gateway then implements the same techniques of step 110 discussed above.

Method 100 reflects the fact that any mobile subscriber unit is reachable from any gateway in system 10. There is no need to have two gateway involved in setting-up and maintaining the local signalling connections. It will be appreciated by those skilled in the art that the present invention minimizes usage of network gateway signalling resources. The present invention recognizes that a local connection can be handled by any gateway in the system with approximately equal efficiency. Thus, a significant advantage of the present invention is that it eliminates the wasted resources used to create and maintain a transit connection. It is another advantage of the present invention to minimize usage of network gateway signalling resources, just as voice cut-through minimizes use of network gateway voice resources. Yet another advantage of the present invention is to reduce the need for transit capacity, since these call segments are used only for a short time per call. A further advantage of the present invention is to attach subscriber unit half-calls at the most logical gateway for the call. Rather than using transit trunks between gateways, another advantage of the present invention is that all calls (e.g., subscriber unit to subscriber unit, subscriber unit to PSTN and PSTN to subscriber unit) are handled by one gateway, thus minimizing usage of network gateway resources.

Accordingly, it is intended by the appended claims to cover all modifications of the invention which fall within the true spirit and scope of the invention.

What is claimed is:

1. A method for setting-up and maintaining communication between a first subscriber unit located in a region serviced by a first gateway and a second subscriber unit located in a region serviced by a second gateway, comprising the steps of:

a) establishing a first local connection between the first subscriber unit and the first gateway; and b) establishing a second local connection between the second subscriber unit and the first gateway without establishing a transit connection between the first gateway and the second gateway.

2. A method as recited in claim 1, further comprising the step of the first subscriber unit sending a connection request to the first gateway.

3. A method as recited in claim 1, further comprising the steps of:

the first gateway determining if the first subscriber unit is coupled to a public-switched telephone network; and the first gateway establishing the second local connection if the first subscriber unit is coupled to the public-switched telephone network.

4. A method as recited in claim 1, further comprising the steps of:

the first gateway determining if the first subscriber unit is coupled to a public-switched telephone network;

the first gateway determining if the second subscriber unit is coupled to the public-switched telephone network; and the first gateway establishing the second local connection to the second subscriber unit if neither the first subscriber unit nor the second subscriber unit is coupled to the public-switched telephone network.

5. A method as recited in claim 1, further comprising the steps of:

the first gateway determining if the second subscriber unit is coupled to a public-switched telephone network; and the first gateway establishing the second local connection to the second subscriber unit if the second subscriber unit is not coupled to the public-switched telephone network.

6. A method as recited in claim 1, further comprising the steps of:

the first gateway determining a location of the second subscriber unit;

the first gateway determining if the second subscriber unit is coupled to a public-switched telephone network; and the first gateway establishing the second local connection to the second subscriber unit if neither the first subscriber unit nor the second subscriber unit is coupled to the public-switched telephone network.

7. A method as recited in claim 1, further comprising the steps of:

the first gateway determining if the second subscriber unit is coupled to a second gateway via a public-switched telephone network; and the second gateway establishing the first local connection to the first subscriber unit if the second subscriber unit is coupled to the second gateway via the public-switched telephone network without establishing a transit connection between the second gateway and the first gateway.

8. A method as recited in claim 7, further comprising the steps of:

the first gateway stopping call setup if the second subscriber unit is coupled to the second gateway via the public-switched telephone network; and the first gateway sending local establishment messages to the second gateway so the second gateway can establish the first local connection.

9. A method for setting-up and maintaining communication between a first subscriber unit and a second subscriber unit, comprising the steps of:
   a) a first gateway determining if the first subscriber unit is coupled to a public-switched telephone network;
   b) the first gateway establishing a local connection to the second subscriber unit if the first subscriber unit is coupled to the public-switched telephone network;
   c) the first gateway determining a location of the second subscriber unit if the first subscriber unit is not coupled to the public-switched telephone network;
   d) the first gateway determining if the second subscriber unit is coupled to a second gateway via the public-switched telephone network; and
   e) the first gateway establishing a first local connection to the first subscriber unit and a second local connection to the second subscriber unit if neither the first subscriber unit nor the second subscriber unit is coupled to the public-switched telephone network, wherein the first gateway establishes the first local connection and the second local connection without establishing a transit connection between the first gateway and a second gateway.

10. A method for setting-up and maintaining communication between a first subscriber unit and a second subscriber unit, comprising the steps of:
   a) a first gateway determining if the first subscriber unit is coupled to a public-switched telephone network;
   b) the first gateway establishing a local connection to the second subscriber unit if the first subscriber unit is coupled to the public-switched telephone network;
   c) the first gateway determining if the second subscriber unit is coupled to a second gateway via the public-switched telephone network if the first subscriber unit is not coupled to the public-switched telephone network; and
   d) the second gateway establishing a local connection to the first subscriber unit if the second subscriber unit is coupled to the public-switched telephone network, wherein the second gateway establishes the first local connection and the second local connection without establishing a transit connection between the first gateway and the second gateway.

11. A system comprising:

a first subscriber unit located in a region serviced by a first gateway;

a second subscriber unit located in a region serviced by a second gateway; and the first gateway coupled to the first subscriber unit by establishing a first local connection and coupled to a second subscriber unit by establishing a second local connection to the second subscriber unit, wherein the first local connection and the second local connection are established without establishing a transit connection between the first gateway and the second gateway.

12. A system comprising:

a first subscriber unit located in a region serviced by a first gateway;

a second subscriber unit located in a region serviced by a second gateway; and the first gateway coupled to the first subscriber unit via a public-switched telephone network and coupled to the second subscriber unit by establishing a local connection to the second subscriber unit without establishing a transit connection between the first gateway and the second gateway.

13. A system comprising:

a first subscriber unit located in a region serviced by a first gateway;

a second subscriber unit located in a region serviced by a second gateway; and the first gateway coupled to the first subscriber unit by establishing a local connection to the first subscriber unit and coupled to the second subscriber unit via a public-switched telephone network without establishing a transit connection between the first gateway and the second gateway.

14. A gateway comprising:

a transceiver capable of communicating with a first subscriber unit located in region serviced by the gateway and a second subscriber unit located in a region serviced by a second gateway; and a processor, coupled to the transceiver, capable of establishing a first local connection to a first subscriber unit and establishing a second local connection to the second subscriber unit without establishing a transit connection between the first gateway and the second gateway.

* * * * *